Patented Feb. 20, 1951

2,542,688

UNITED STATES PATENT OFFICE 2,542,688

DIPHENOL COMPOUND FOR COCCIDIOSIS CONTROL

Julius E. Johnson, Jr., Midland, and Dorsey R. Mussell, Clare, Mich., assignors to The Dow Chemical Company, Midland, Mich., a corporation of Delaware No Drawing. Application May 12, 1949, Serial No. 92,948

5 Claims. (Cl. 167—53.1)

This invention is related to coccidiosis control and is particularly directed to methods and compositions for the suppression of coccidiosis in poultry and the like.

Domestic fowl are subject to a number of different diseases. One of these diseases, coccidiosis, causes high mortality amongst fowl of all ages and is especially destructive in young maturing birds. The disease is caused by minute parasitic protozoan organisms known as coccidia. These parasites pass through certain stages of development away from the host organism and later continue their life cycle in the bodies of fowl.

The coccidia gain access to and multiply in various organs of the host's body, but particularly in epithelial tissue of the digestive tract. During the processes of growth and reproduction, these organisms erode the epithelial tissue of the cecum and small intestine, bringing about hemorrhage, weakness, digestive disturbances, and emaciation. Birds, if they do not rapidly succumb to the infection, are rendered economically unfit by chronic forms of the disease.

The disease is contracted through the ingestion of coccidial oöcysts found in the feed, water, and soil contaminated with fecal droppings of fowl harboring the parasites. The coccidial organisms are widely distributed, being carried on or in grain sacks, running water, shoe soles, and by birds, and flies and other insects which fly from one poultry yard to another. The ingestion of a single organism is capable of producing a mild form of the disease, the organism rapidly multiplying in the body of the fowl and later being spread to the entire flock through infected fecal droppings. Due to the great reproductive capacity of the coccidial organism and the ease with which the disease is spread, no poultry grower may ever feel free of the menace of this infection.

As might be expected, numerous predicaments have been advocated and made available for the suppression of coccidiosis. Certain of these materials have been of little efficacy, while others are too expensive or too toxic for prophylactic administration. One of the difficulties encountered in such administration has been the adverse effect which certain of the materials have upon metabolic activity. Another difficulty has been the poisoning of the blood-forming organs and a subsequent reduction in the number of red and white blood cells throughout the body. These effects have made the use of many remedies hazardous and unprofitable. The need for inexpensive prophylactic methods for the suppression of coccidial infection is well recognized, as the disease constitutes one of the major problems confronting the poultry industry.

According to this invention, we have discovered that coccidial infection in poultry may be suppressed by feeding the fowl a diphenol having the formula

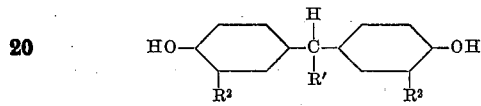

wherein R' is a phenyl or an alkyl radical containing from 1 to 6 carbon atoms, inclusive, and $R^2$ is hydrogen or an alkyl radical containing from 1 to 3 carbon atoms, inclusive. These compounds are crystalline solids and inexpensive to prepare. They are not repellent to poultry and may be employed in admixture with the feed. They may be administered continuously or intermittently in dosages sufficient to suppress the development of infection without adversely affecting metabolic activity or imparting any unpalatable characteristic to the flesh of the fowl. The compounds are most effective in suppressing the disease when ingested prior to or within a reasonable time following exposure to infection.

Good results are obtained when each bird is fed daily from 150 to 700 milligrams of the diphenol per kilogram of body weight. The preferred dosage varies somewhat with the particular compound employed. When the compounds are administered with feeds, satisfactory results are obtained with medicated feeds containing from 0.1 to 1 per cent by weight of the agent.

A convenient mode of operation comprises dispersing a finely ground diphenol compound in the feed employed as a sole or part ration for the flock. The diphenol agent may be dissolved in a small amount of an organic solvent such as acetone or methylene chloride, the resulting mixture dispersed in the feed, and the feed dried to remove the solvent. Also, the anticoccidial agent may be dissolved in an edible oil, such as coconut, olive, cottenseed or peanut oil, and the resulting solution dispersed in the feed. Any commercial starting, growing or laying mash may be employed as a carrier for the agent. Such feed should contain a quantity of ground grains, meat or protein substitute, powdered milk, minerals, and vitamins sufficient to funish a diet adequate for the metabolic requirements of the fowl concerned. Alternatively, the compounds, either alone or dispersed in a suitable non-toxic carrier, may be administered in the form of capsules or tablets.

The diphenol compounds of this invention may be prepared by reacting 1 mole of an aldehyde with 2 moles of phenol or a suitable substituted phenol. In practice the use of a molecular excess of the phenolic reactant is preferred. Examples of aldehydes which may be employed are acetaldehyde, propionaldehyde, butyraldehyde, valeric aldehyde, caproic aldehyde, heptylic aldehyde, and benzaldehyde. Operable phenolic reactants include phenol, 2-methylphenol, 2-ethylphenol, and 2-isopropylphenol. The reaction is carried out in the presence of (1) a sulphur-containing catalyst, such as sulphur monochloride, sulphur dichloride, sodium sulphide or normal butylmercaptan, and of (2) an acid condensing agent, such as hydrochloric acid, sulphuric acid, or hydrogen chloride. Good results are obtained in preparations carried out at temperatures of 40° C. or lower and employing 5 moles of phenol or substituted phenol per mole of aldehyde. In practice, from about 0.1 to 0.3 mole of hydrogen chloride per mole of aldehyde present in the mixture has been found to favor the production of the compounds in high yields.

The phenol, aldehyde, and catalyst are mixed together and gaseous hydrogen chloride bubbled through the reaction zone at a temperature below 40° C. The condensation begins immediately upon the introduction of hydrogen chloride with the production of the desired diphenol compound and water of reaction. The reaction is exothermic and stirring and cooling are generally required during the addition of the condensing agent to prevent overheating. Upon completion of the reaction, the desired product may be separated in conventional manner by repeated washing with water, fractionally distilling under reduced pressure to recover water and excess phenolic reactant, steaming the residue to remove last traces of phenol, and recrystallization.

This application is a continuation-in-part of our co-pending application, Serial No. 34,134, filed June 19, 1948, now Patent No. 2,535,014.

The following examples are illustrative and not to be construed as limiting:

*Example 1*

4,4'-propylidene-diphenol (melting at 128°–130° C.) having the formula:

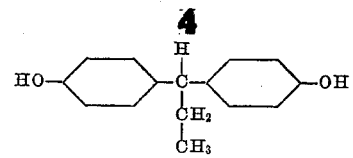

was dissolved in a small quantity of acetone to prepare a concentrated solution of the anticoccidial agent. This solution was then dispersed in a commercial poultry starting mash and the acetone removed from the resulting composition by evaporation. The diphenol was employed in an amount sufficient to produce a mash containing 0.2 per cent by weight of the agent. This composition and the unmodified starting mash were fed as sole ration to two groups of chickens of the same history and past environment. Each such test group consisted of 10 chickens which were two weeks of age. 48 hours after the initiation of the diet, 40,000 *Eimeria tenella* oöcysts were introduced directly into the crop of each bird. Seven days following the inoculation, the birds were sacrificed and autopsied. A cecal examination of each bird was carried out to determine the extent of cecal necrosis, and a sample of cecal content removed and examined microscopically for the presence or absence of oöcysts. The numerical ratings, 0, 1, 2, 4, and 8, corresponding to none, trace, slight, moderate, and severe, respectively, were assigned both to the degree of necrosis and the incidence of oöcysts in the cecum. The ratio of the summation of these ratings to the total number of observations carried out in the particular group of fowl gives the average degree of infection present in the birds. A comparison between the degrees of infection of treated and untreated control groups serves as a basis for estimating the efficacy of the treatment according to the following formula:

$$\text{Index of efficacy} = \frac{(X-Y)}{X} \cdot 100$$

wherein X represents the degree of infection of control birds and Y the degree of infection of treated birds. The numerical ratings, degrees of infection, and index of efficacy are recorded in the following table:

|  | Chickens Fed Modified Mash | Chickens Fed Unmodified Mash |
|---|---|---|
| Chicken No. | 1-2-3-4-5-6-7-8-9-10 | 1-2-3-4-5-6-7-8-9-10 |
| Numerical rating of cecal necrosis | 1-0-0-1-4-1-0-1-1- 2 | 8-4-2-4-4-8-8-4-2- 4 |
| Numerical rating of the Incidence of cecal oocysts | 1-0-0-1-4-1-0-1-1- 0 | 4-8-4-4-4-8-4-4-4- 8 |
| Degree of Infection in the group | 1.0 | 5.0 |
| Index of Efficacy | 80 | |

*Example 2*

Various diphenol compounds of the invention were separately dissolved in a small quantity of acetone and the resulting solution dispersed in a commercial poultry starting mash to prepare compositions containing a known concentration of the anticoccidial agent. Each such composition and unmodified mash were tested as described in Example 1. Each test group of chickens contained the indicated number of birds. In a control operation, a commercial anticoccidial agent, sulfaguanidine, was dispersed in starting mash and this mash and unmodified mash tested in a similar manner. The following table sets forth the results obtained:

| Active Ingredient | Formula | Number of Chickens Employed in Each Test Group | Per Cent by Weight of Diphenol in Mash | Index of Efficacy |
|---|---|---|---|---|
| 4,4'-benzylidene-di (2-isopropylphenol) (Melting Point of 124.5°–125.5° C.). | | 3 | 0.3 | 90 |
| 4,4'-heptylidene-di (2-methylphenol) (M. P. 78°–81° C.). | | 10<br>10 | 0.3<br>0.2 | 100<br>91 |
| 4,4'-heptylidene-di (2-isopropylphenol) (a resin with no clearly defined melting point). | | 3 | 1.0 | 78 |
| 4,4'-hexylidene-di (2-methylphenol) (M. P. 77°–78° C.). | | 3 | 0.4 | 79 |
| 4,4'-(3-methylbutylidene)-diphenol (M. P. 150°–154° C.). | | 3 | 0.2 | 80 |
| 4,4'-(2-methylbutylidene)-diphenol (M. P. 143.5°–145.5° C.). | | 3 | 0.3 | 77 |
| 4,4'-butylidene-diphenol (M. P. 138°–139.5° C.). | | 3<br>3 | 0.3<br>0.2 | 90<br>81 |
| 4,4'-butylidene-di (2-isopropylphenol) (a resin with no clearly defined melting point). | | 3 | 0.4 | 87 |

| Active Ingredient | Formula | Number of Chickens Employed in Each Test Group | Per Cent by Weight of Diphenol in Mash | Index of Efficacy |
|---|---|---|---|---|
| 4,4'-propylidene-diphenol | 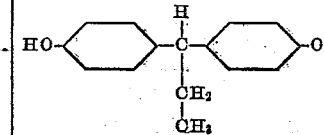 | 10 | 0.3 | 93 |
| 4,4'-propylidene-di (2-methyphenol) (M. P. 94° C.). | 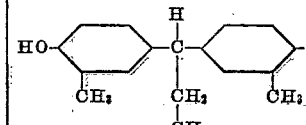 | 10 | 0.3 | 90 |
| 4,4' propylidene-di (2-isopropylphenol) (M. P. 105°–107° C.). | 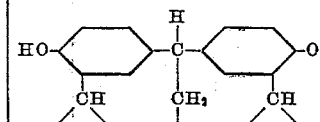 | 3 | 0.4 | 78 |
| 4,4'ethylidene-di (2-methylphenol) (M. P. 100° C.). | 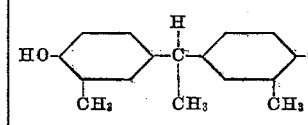 | 3 | 0.4 | 81 |
| 4,4'-ethylidene-di (2-isopropylphenol) (M. P. 91°–92° C.). | 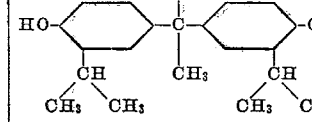 | 3 | 0.3 | 76 |
| Sulfaguanidine | | 10 | 0.2 | 0 |
| | | 10 | 0.3 | 38 |
| | | 10 | 0.4 | 46 |
| | | 10 | 0.5 | 83 |

*Example 3*

Other diphenol compounds were separately dispersed in a commercial poultry starting mash to form homogeneous dispersions of the anticoccidial agents in the form of medicated feed compositions. Each such composition and unmodified starting mash was tested in the manner previously described, except the diets of modified mash were initiated 24 hours prior to the introduction of the coccidial oöcysts into the crops of the birds. In a control operation, a commercial anticoccidial agent, sulfamerazine, was dispersed in starting mash and this mash and unmodified mash tested in a similar manner. The following table sets forth the results obtained:

| Active Ingredient | Formula | Number of Chickens Employed in Each Test Group | Per Cent by Weight of Diphenol in Mash | Index of Efficacy |
|---|---|---|---|---|
| 4,4'-benzylidene-diphenol (Melting Point of 160°–164° C.). | 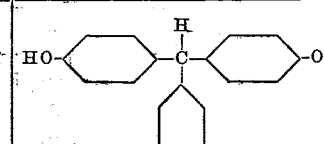 | 4 | 0.3 | 72 |
| 4,4'-heptylidene-diphenol (M. P. 109.5°–110.5° C.). | 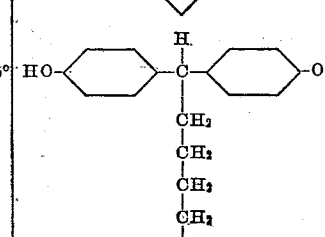 | 4 | 0.3 | 100 |
| Sulfamerazine | | 4 | 0.3 | 92 |

We claim:
1. A composition for the suppression of coccidial infection in fowl which comprises a poultry feed and dispersed therein as an active ingredient a diphenol having the formula:

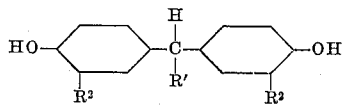

wherein R' represents a member of the group consisting of phenyl and the alkyl radicals containing from 1 to 6 carbon atoms, inclusive, and $R^2$ represents a member of the group consisting of hydrogen and the alkyl radicals containing from 1 to 3 carbon atoms, inclusive.

2. A composition as defined in claim 1 wherein the diphenol is present in the amount of from 0.1 to 1.0 per cent by weight of the composition.

3. A composition for the suppression of coccidial infection in poultry which comprises a poultry feed and dispersed therein as an active ingredient 4,4'-propylidene-diphenol in the amount of from 0.1 to 1 per cent by weight of the composition.

4. A composition for the suppression of coccidial infection in poultry which comprises a poultry feed and dispersed therein as an active ingredient 4,4'-propylidenedi(2-methylphenol) in the amount of from 0.1 to 1 per cent by weight of the composition.

5. A composition for the suppression of coccidial infection in poultry which comprises a poultry feed and dispersed therein as an active ingredient 4,4'-heptylidene-diphenol in the amount of from 0.1 to 1 per cent by weight of the composition.

JULIUS E. JOHNSON, JR.
DORSEY R. MUSSELL.

REFERENCES CITED

The following references are of record in the file of this patent:

UNITED STATES PATENTS

| Number | Name | Date |
| --- | --- | --- |
| 2,139,081 | Honel | Dec. 6, 1938 |
| 2,279,421 | Tisdale | Apr. 14, 1942 |

OTHER REFERENCES

Chemical Abstracts, vol. 35, page 1781 (1941).
Craige: North American Veterinarian, vol. 27, Jan. 1946, pages 26 to 30.